(12) United States Patent
Mitzel et al.

(10) Patent No.: US 9,299,991 B2
(45) Date of Patent: Mar. 29, 2016

(54) ELECTROCHEMICAL DEPOSITION OF NANOSCALE CATALYST PARTICLES

(71) Applicant: Universität des Saarlandes, Saarbrücken (DE)

(72) Inventors: Jens Mitzel, Ottweiler (DE); Rolf Hempelmann, St. Ingbert (DE); Vivien Annel, Frankfurt (DE); Harald Natter, Saarbrücken (DE); Manfred Stefener, München (DE)

(73) Assignee: Universitat des Saarlandes, Saarbrucken (DE)

( * ) Notice: Subject to any disclaimer, the term of this patent is extended or adjusted under 35 U.S.C. 154(b) by 334 days.

(21) Appl. No.: 13/776,260

(22) Filed: Feb. 25, 2013

(65) Prior Publication Data

US 2013/0168254 A1    Jul. 4, 2013

Related U.S. Application Data

(63) Continuation of application No. PCT/EP2011/004162, filed on Aug. 18, 2011.

(30) Foreign Application Priority Data

Aug. 27, 2010    (DE) .......................... 10 2010 035 592

(51) Int. Cl.
    *C25D 3/02*        (2006.01)
    *C25D 3/56*        (2006.01)
    (Continued)

(52) U.S. Cl.
    CPC .............. *H01M 4/8853* (2013.01); *B01J 23/42* (2013.01); *B01J 35/0013* (2013.01); *B01J 37/348* (2013.01); *B82Y 30/00* (2013.01); *B82Y 40/00* (2013.01); *C25D 5/003* (2013.01); *C25D 5/18* (2013.01); *C25D 17/12* (2013.01); *C25D 21/04* (2013.01); *H01M 4/8807* (2013.01); *H01M 4/92* (2013.01); *H01M 8/1002* (2013.01); *H01M 2008/1095* (2013.01); *Y02E 60/521* (2013.01)

(58) Field of Classification Search
    CPC . H01M 4/8842; H01M 4/8846; H01M 4/885; C25D 21/04; C25D 5/003
    See application file for complete search history.

(56) References Cited

U.S. PATENT DOCUMENTS

| | | |
|---|---|---|
| 3,124,520 A | 3/1964 | Juda |
| 3,793,165 A | 2/1974 | Juda et al. |
| 4,900,406 A | 2/1990 | Janssen et al. |
| 6,277,261 B1 | 8/2001 | Divisek et al. |

(Continued)

FOREIGN PATENT DOCUMENTS

| | | |
|---|---|---|
| CA | 2288678 A1 * | 11/1998 |
| DE | 19720688 | 6/1998 |

(Continued)

OTHER PUBLICATIONS

International Search Report issued by the European Patent Office (EPO) for corresponding International Application No. PCT/EP2011/004162, with mailing date of Nov. 6, 2012.

*Primary Examiner* — Nicholas A Smith
*Assistant Examiner* — Brian W Cohen
(74) *Attorney, Agent, or Firm* — Myers Wolin, LLC

(57) ABSTRACT

A process for the electrochemical deposition of nanoscale catalyst particles using a sacrificial hydrogen anode as counter electrode for the working electrode is disclosed, whereby a concurrent development of hydrogen at the working electrode is mostly or completely avoided.

15 Claims, 4 Drawing Sheets

(51) Int. Cl.
  *C25D 17/02*   (2006.01)
  *C25D 21/04*   (2006.01)
  *H01M 4/88*    (2006.01)
  *C25D 5/00*    (2006.01)
  *B01J 23/42*   (2006.01)
  *B01J 35/00*   (2006.01)
  *B01J 37/34*   (2006.01)
  *B82Y 30/00*   (2011.01)
  *B82Y 40/00*   (2011.01)
  *C25D 5/18*    (2006.01)
  *C25D 17/12*   (2006.01)
  *H01M 4/92*    (2006.01)
  *H01M 8/10*    (2006.01)

(56) References Cited

U.S. PATENT DOCUMENTS

| | | |
|---|---|---|
| 6,410,175 B1 | 6/2002 | Tillmetz et al. |
| 2004/0035705 A1 | 2/2004 | Hempelmann et al. |
| 2007/0167313 A1 | 7/2007 | Sano et al. |
| 2010/0009234 A1 * | 1/2010 | Stefener .................. 429/30 |

FOREIGN PATENT DOCUMENTS

| | | |
|---|---|---|
| DE | 69901386 | 11/2002 |
| EP | 1307939 | 5/2003 |
| WO | 0056453 | 9/2000 |
| WO | 2008101635 | 8/2008 |
| WO | WO 2008104322 A2 * | 9/2008 |
| WO | 2009010300 | 1/2009 |

* cited by examiner

ELECTROCHEMICAL DEPOSITION OF NANOSCALE CATALYST PARTICLES

This application is a continuation under 35 USC §120 of International Application PCT/EP2011/004162 filed on Aug. 18, 2011, and claims priority to DE Application 10 2010 035 592.5 filed on Aug. 27, 2010, the contents of each of which are incorporated by reference herein.

The present invention pertains to a process for the electrochemical deposition of nanoscale catalyst particles which can be applied especially within the framework of manufacturing electrodes for electrochemical devices such as fuel cells, electrolyzers or other electrochemical sensors and reactors.

In a fuel cell, fuel is electrochemically converted with an oxidizing agent or oxidant, whereby both reaction chambers are physically separated from one another. Types of fuel that can be used are hydrogen as well as organic substances of low molecular weight such as alcohols. The preferred oxidizing agent to be used is oxygen or atmospheric oxygen. Especially at low temperatures, this type of electrochemical conversion is clearly more effective than e.g. combustion engines.

The conversion of both reactants in a PEM-fuel cell takes place at a membrane electrode assembly (MEA) which consists of two gas diffusion electrodes (GDE's), which are compacted with a polymeric ionomer membrane. On the anode side, the fuel is oxidized while on the cathode side, the oxidant is reduced. This conversion usually takes place in platinum catalysts which are supported on soot particles. Today, platinum-containing alloy catalysts are also used in order to increase the CO tolerance of these catalysts, i.e. their reactivity.

These supported catalyst particles are conventionally applied together with an ionomer on a gas diffusion layer (GDL) and in this way form the catalyst layer. In doing so, the conversion can take place through various processes such as doctor-blading, inkjet or spray coating. With these processes, the catalyst particles are statistically spread out over the catalyst layer, by which particles are also situated in spots in which they are not electrically (via the carbon) or ionically (via the ionomer) connected with, or have no contact with the reactant phase. Therefore, it is assumed that these particles are not located in the 3 phase zone and can thus not participate in the catalytic conversion of the reactant. This way, up to 30% of the utilized catalyst metal is not used, which unnecessarily raises the cost of the completed fuel cell system. By increasing the utilization of the catalyst, either the precious metal content of the GDE's can be reduced while offering the same level of capacity and thereby lowering the cost, or the performance level can be proportionately increased without changing the precious metal load.

The goal of the present invention is to improve particularly the profitability of PEM-fuel cells via a more selective deposition of the catalyst particles in the 3 phase zone.

The electrochemical deposition of nanoscale electro catalysts has been described in WO 00/56453. In this process, the catalysts from an electrolytic bath with precious metal salts are isolated on a carbonic substrate. However, with this process, a large portion of the catalyst particles is deposited at the electrode surface, and the catalyst particles are not spread out evenly over the catalyst layer. Furthermore, by using precious metal-bearing, electrolytic baths, there is the disadvantage of loss of precious metals and the high processing costs of the mostly toxic baths. When being separated from an electrolytic bath, the metal ions must also diffuse from the bath to the electrode surface and can there be reduced in those places, in which catalyst particles have already formed. This can lead to strong growth of the particles and to agglomerate formation.

The disadvantages of these baths were bypassed in DE 197 20 688 C1 by applying a precious metal salt layer between an electrode and an electrolyte and by separating the catalysts from this system. However, even this way, the catalyst is mainly deposited on the electrode surface and not spread out evenly over the catalyst layer. Since the deposition was also conducted within a steam atmosphere, this process lead to undesired loss of metal.

By using a precursor layer in which the catalyst salt is contained, it was possible to improve the distribution of the precious metal salts and the catalysts separated therefrom, as in EP 1 307 939 B1. In this process, too, the electrochemical deposition takes place in a steam atmosphere in order to ensure the ionic conductivity of the ionomer membrane. With this process, however, the moisture introduced also reaches the working electrode side and dissolves the usually very water soluble, precious metal salts which leads to a mobilization of these salts. On the one hand, this can again lead to the undesired loss of precious metal ions, and on the other, it can enable the migration of the ions to already separated platinum particles and thus lead to the growth of larger catalyst agglomerates. Hereby, the catalytically useable surface and as a result, the performance of the GDE, drops. The thus formed catalyst particles and agglomerates no longer have to be necessarily positioned in the 3 phase zone since besides the applied ionomer, the aqueous solution of the metal salts in the precursor layer can also assume the ionic conduction.

The process described in printed documentation WO 2008/101635 A1 and WO 2009/010300 A1 solves these problems with a galvanostatic deposition of the precious metals from a precursor layer with the help of a liquid electrolyte such as diluted acids. Through the fast deposition when closing the electrical circuit by adding the electrolyte and by using ultrahydrophobe substrates, the diffusion of precious metal ions and thus the strong growth of catalyst particles and agglomerates can for the most part be inhibited.

By using this galvanostatic-led process, however, especially with high current densities, large quantities of gaseous hydrogen develop, which partially dissolve in the utilized electrolytes. With this hydrogen, the precious metal salt can also be reduced. This chemical reduction does not necessarily have to take place on one of the soot particles that are in electric contact with the GDL, which can lead to particles forming outside of the 3 phase zone. Moreover, a potentiostatically operated deposition using the same process is only feasible on a small scale since it is not possible to keep the potential constant over a sufficiently large surface, allowing the use of a commercial electrode. Since the potentiostatic deposition usually proceeds significantly slower than the galvanostatic one, the use of a liquid electrolyte would also lead to ion diffusion and to particle and agglomerate growth.

It is thus the task of the present invention to provide an improved process for the electrochemical deposition of catalyst particles as compared to the afore-explained, currently available technology. Another aspect of the present invention is to avoid the undesired diffusion of the metal ions in the produced precursor layer in order to maintain the dispersed catalyst particles on the substrate and to avoid an undesired formation of agglomerate, i.e. a too strong growth of particles. Per patent claim 1, this task is solved by using a sacrificial hydrogen anode which functions as a counter electrode for the working electrode during the process of electrochemical deposition of nanoscale catalyst particles. The working electrode potential hereby shows mainly positive signs towards the sacrificial hydrogen anode during the separation process with respect to timing, so that a simultaneous formation of hydrogen at the working electrode can be mostly or completely avoided.

Further advantages of the present invention are mentioned in the contingent patent claims and the following description.

Figure 1:
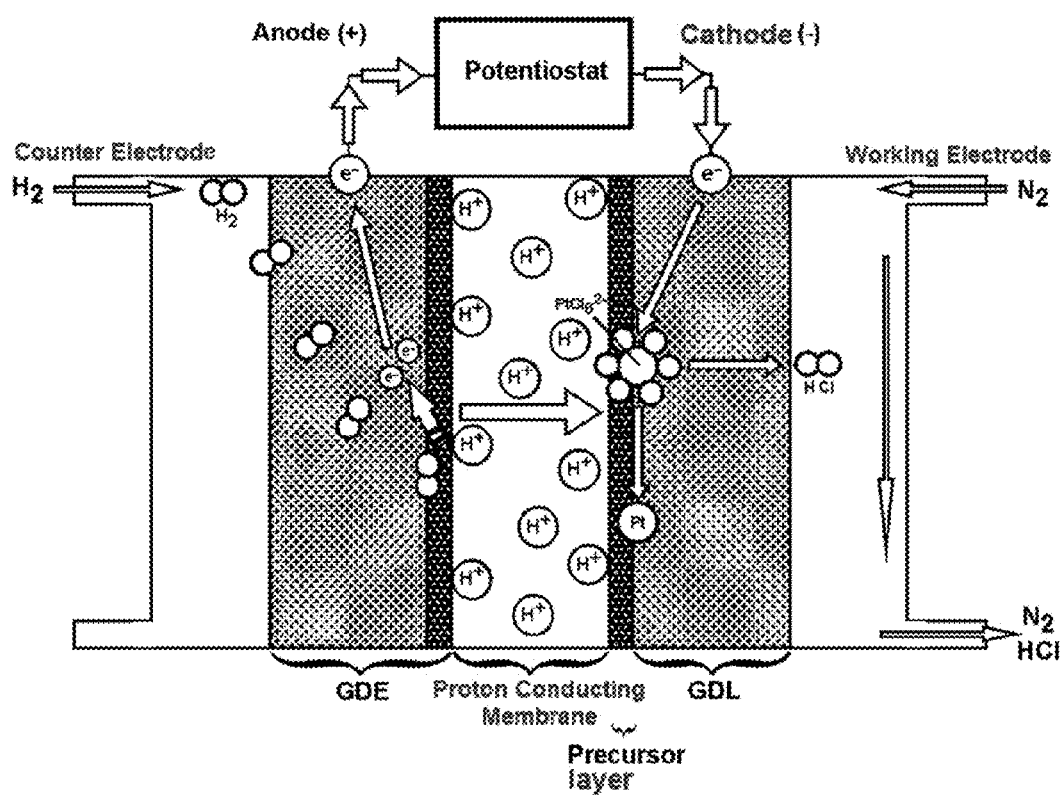
FIG. 1 is a schematic drawing of the deposition.

Within the framework of the present invention it is thus possible, as further outlined below, to electrochemically separate metallic nanoparticles (preferably precious metal catalysts) in such a way that the side reaction of the chemical reduction of the catalyst precursor simultaneously taking place can mostly or completely be prevented with the resulting hydrogen. This is possible because by using a sacrificial hydrogen anode in the sense of the invention and by setting an appropriate electrochemical potential, i.e. potential curve, between the working electrode and the sacrificial hydrogen anode, the formation of hydrogen at the working electrode-side is mostly or completely avoided in the sense of the invention.

With a suitable reaction control, the ionic conduction in an electrochemical deposition in the sense of the invention can mainly be assumed by a solid ionomer. It is preferable that the deposition takes place in situ from a metal salt containing precursor layer which is applied on a substrate. The substrates with nanocatalysts formed this way can be used as electrodes in electrochemical devices such as fuel cells, electrolyzers and other electrochemical sensors and reactors. This process was specifically developed to produce gas diffusion electrodes (GDE) for polymer electrolyte membrane fuel cells (PEM-Fuel Cells).

The specimens to be separated should preferably be made of a GDL which is coated with a precursor layer. A precursor layer is understood to be a layer of one or more conductive substrates (e.g. soot), one or more ionomers, as well as salts of the metal which later is intended to act as a catalyst. With alloy depositions, accordingly more salts are introduced. The most favorable thickness of the precursor layer lies between 5 and 50 µm and can be adjusted according to the desired load. In order to apply this layer to the GDL, the insoluble substrate is dispersed in an ionomer solution, metal salt solution (precursors) as well as in one or more solvents such as e.g. alcohols. The actual application of the material can be made with a variety of coating processes such as doctor-blading, screen printing, airbrushing, inkjet and similar processes. Alternatively, the layer can also be applied without the precursor. This enables production and handling of the layer without any additional limitations of the conditions due to the precursor salt used. The salt can then be applied in a later impregnation step, e.g. by spraying into the already existing substrate ionomer layer. Basically, all commercially obtainable GDLs can be used for this process. Woven or non-woven GDLs as well as GDLs with or without a MPL (microporous layer) can be used. Depending on the nature of the GDL and the coating method used, only the solvent concentration, i.e. its composition, has to be varied. In order to improve the application and adhesion of the precursor layer, it is also possible to add additives such as binding agents, dispersing agents, wetting agents and thickeners.

Additives which then influence the deposition can also be added to the precursor layers. Examples are grain refiners, surfactants and complexing agents.

Before the actual electrodeposition, the precursor layer is dried, which depending on the precursor used is subject to restrictions since especially precious metal salts possess a limited thermal stability. In order to completely dry the layers, elevated temperatures, lowered pressure, protective gas and other drying techniques can be used. By separately applying the substrate ionomer layer without a precursor, the drying conditions are not limited by the precursor.

Hydrogen formation at the working electrode (cathode) during metal deposition is avoided by using a sacrificial hydrogen anode as counter electrode (one that is suitable for the hydrogen oxidation), which at the same time can serve as a benchmark for uniform potential control over a large surface. The design of a suitable device in order to execute the invented process is shown in FIG. 1 using a platinum deposition of hexachloroplatinic acid ($H_2PtCl_6$). The outer structure is made up of electrically conductive end plates and electrically conductive flowfields. Via the end plates, the gasses are supplied and extracted, the electrical lines are contacted and, if applicable, the entire cell is heated with the aid of heater cartridges. With their meander shaped channels, the flowfields serve to homogeneously disperse gas and to contact the sense lines (voltage metering).

Inside this device, a GDE with a supported platinum catalyst is located on the counter electrode side (anode) which has been hot pressed with an ionomer membrane. The ionomer membrane serves as a solid electrolyte for metal deposition and for the separation of the two electrode chambers. A specimen in the form of a gas diffusion layer coated with the precursor layer is located on the working electrode side (cathode), which contains the metal ions that are to be deposited. The contact between the precursor layer and the ionomer membrane is achieved by bolting the entire device with a defined torque.

During the deposition, wetted hydrogen flows through the counter electrode side. The moistening is necessary because the ionomer membranes used need to absorb moisture in order to be sufficiently conductive for deposition. The hydrogen itself is oxidized at the platinum catalyst located at the counter electrode, which functions as a sacrificial hydrogen anode, and the resulting protons can reach the working electrode side through the ionomer membrane. The electrons freed by this oxidation are extrapolated via the outer circuit.

In this example, the electrons provided at the working electrode reduce the platinum ions. Hydrogen chloride is formed from the freed chloride ions and the protons of the counter electrode side, and needs to be extrapolated. For this reason, the working electrode side is rinsed during the deposition with an inert gas such as nitrogen. The nitrogen flow furthermore extrapolates any moisture that may arise so that the ionic conductivity is ensured to take place via the ionomer and not via a liquid phase. This way, the catalyst metal can only be deposited in the immediate vicinity of the ionomer and its contact to the ion-conducting phase is assured to take place in the fuel cell operation. Also, the diffusion of the metal ions is suppressed through the dry environment at the working electrode, which could otherwise lead to a strong growth of particles and agglomerates.

As described, the deposition of the catalyst particles takes place in a 2-electrode-circuit. When using a potential-controlled mode of operation with this type of circuit, one correlates the potential of the working electrode to the one of the counter electrode and, under normal operation there is thus no fixed benchmark. With the here utilized sacrificial hydrogen anode, however, a well-known system is used which has a very low overvoltage for hydrogen oxidation on platinum. Thus, this involves a dynamical hydrogen electrode (DHE).

Figure 2:
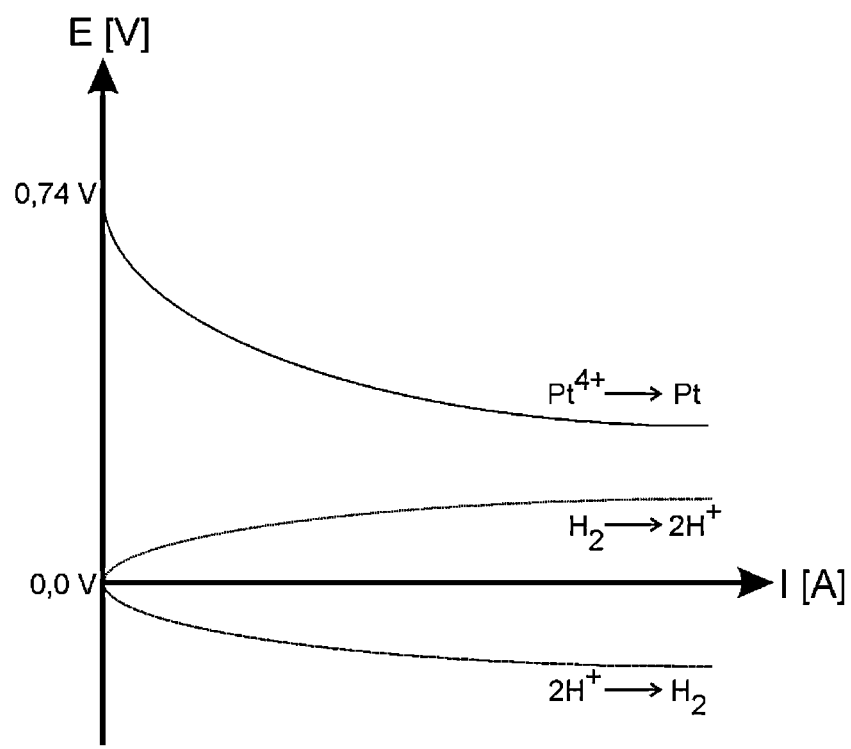
FIG. 2 is a schematic drawing of the potential curve.

Since the overvoltage for an oxidation (such as hydrogen dissolution) always has a positive sign and the overvoltage for a reduction (such as hydrogen evolution) always has a negative, a negative potential in relation to the counter electrode would have to be set up at the working electrode in order to create hydrogen. As long as the potential at the working electrode is kept positive, no hydrogen will form there and the catalyst metal will only be extrapolated electrochemically. For clarification, the course of the potentials is schematically shown in FIG. 2. Thus, in the case of the formed catalyst particles, the contact to the electron-conducting phase is always assured.

The implemented, potential-controlled deposition can be performed with either a defined direct voltage or a variable potential profile. These variable potential profiles can consist of voltage ramps or simple and double rectangular pulses, whereby an electrical potential, i.e. a potential curve with always positive signs which is also always greater than zero, should be chosen in order to completely avoid hydrogen formation at the working electrode side (and the hereby caused chemical reduction of the precursor salt outside of the 3 phase zone) at the working electrode (opposite the DHE). This is clearly an especially favorable version of the present invention. Trials have shown that with this type of potential (curve), a (working electrode-side) formation of gaseous hydrogen can be effectively prevented.

It has furthermore been shown that within the framework of the present invention—especially when using potentiostatic double pulses—the use of short-term, negative voltage pulses ("germ formation pulses") can prove to be quite advantageous, as long as a mainly positive potential curve is ensured in a timely manner to mostly avoid a working electrode-side hydrogen formation. Thus, in the present case, we mostly assume the prevention of hydrogen formation—as compared with currently available technology—when, as stipulated in the sense of the invention, the difference of the electrical potential between the working electrode and the sacrificial hydrogen anode during the deposition process shows an at least mostly positive sign (in respect to its chronological sequence).

With such negative voltage pulses which interrupt the usually mostly positive electrical potential at the working electrode, the number of forming germs for the catalyst deposition can be considerably increased, by which the term "germ formation pulses" is justified. Particularly advantageous, however, is that the duration of the germ formation pulses with negative working electrode potential against the DHE is clearly shorter than the duration of pulses with positive signs which lie in between.

A preferred version of the present invention allows the potential curve to be chosen or adjusted in such a way during the deposition process that with respect to the sacrificial hydrogen anode, the working electrode potential is at least 90%, and in regards to the total deposition time at least 95% positive, so that a negative voltage potential (e.g. from possible germ formation impulses) dominates during no more than 10%, or preferably no more than 5%, of the deposition time. This way, only a very small formation of hydrogen at the working electrode takes place, i.e. is allowed.

In this context it should be noted that during (potentiostatic or galvanostatic) electrochemical deposition processes according to currently available technology, usually approximately 50%-97% of the charge carriers introduced at the working electrode-side by the current flow cause the formation of (gaseous) hydrogen, whereas only the remainder of the current flow contributes to the electrochemical deposition of the precious metal. In contrast, and within the framework of the present invention, the introduced load at a constant positive potential at the working electrode can directly cause up to 100% and, by using negative germ formation pulses in the afore-mentioned fashion, still up to 95% (and more) of the desired electrochemical deposition of the catalyst. This demonstrates that by using the present invention, the working electrode-side formation of hydrogen is drastically reduced, or even completely prevented, as compared to currently available technology. After creating a catalyst layer according to the invented production process and washing the catalyst salts still present in the layer, these numbers were confirmed on an experimental basis by calculating the introduced load as an integral over the predominant course of the electric current during the deposition (between the anode and cathode sides) and then comparing it to the amount of catalyst actually deposited in the specimen and to the charge carriers needed for this purpose.

Incidentally, the presented setup also allows galvanostatic deposition. Since, however, the voltage at the working electrode is not controlled it is possible for hydrogen to form during deposition, which can lead to chemical reduction. If during galvanostatic deposition the potential is restricted to positive potentials toward the counter electrode, this problem can be avoided.

The invented process thus represents an option of depositing supported nanoscale catalyst particles in a precursor layer on large surfaces in a potential-controlled manner. In this way, the simultaneous hydrogen formation at the working electrode can be mostly or completely prevented, by which the catalyst particles are (nearly) completely, electrochemically deposited. Due to the dry conditions of the working electrode during deposition, the diffusion of the ions and thus the growth of particles and agglomerates are suppressed. Nanoscale catalyst particles are mainly defined as particles with a diameter between 1 and 100 nm. The catalyst particles normally produced for PEM-Fuel Cells usually have a size between 1 and 5 nm.

The invention is portrayed in the following application examples to facilitate better understanding. These examples merely serve to explain and neither restrict the invention nor its scope of protection in any way.

APPLICATION EXAMPLES

Example 1

Potentiostatic, Direct Voltage Deposition of Platinum Catalyst Particles

For the production of the precursor layer, a commercially available GDL with MPL is impregnated with a platinum precursor, or a precursor layer produced per printed documentation WO 2008/101635 A1 and WO 2009/010300 A1 is used.

The resulting specimen is built into the electrochemical deposition cell with a sacrificial hydrogen anode and the specimen is deposited according to the following parameters.

Mode: Direct voltage deposition
Working electrode potential: 150 mV vs. DHE
Deposition duration: 15 minutes
Wetted hydrogen stream (95% relative moisture at 25° C.): 40 ml/min
Nitrogen stream: 300 ml/min During deposition, nanocrystalline platinum particles 10-15 nm in diameter with agglomerate formation of up to 100 nm are formed.

Example 2

Potentiostatic Pulse Deposition of Platinum Catalyst Particles

Analogous to Example 1, a commercially available GDL with MPL is impregnated with a platinum precursor for the production of the precursor layer, or a precursor layer produced per printed documentation WO 2008/101635 A1 and WO 2009/010300 A1 is used.

Figure 3:
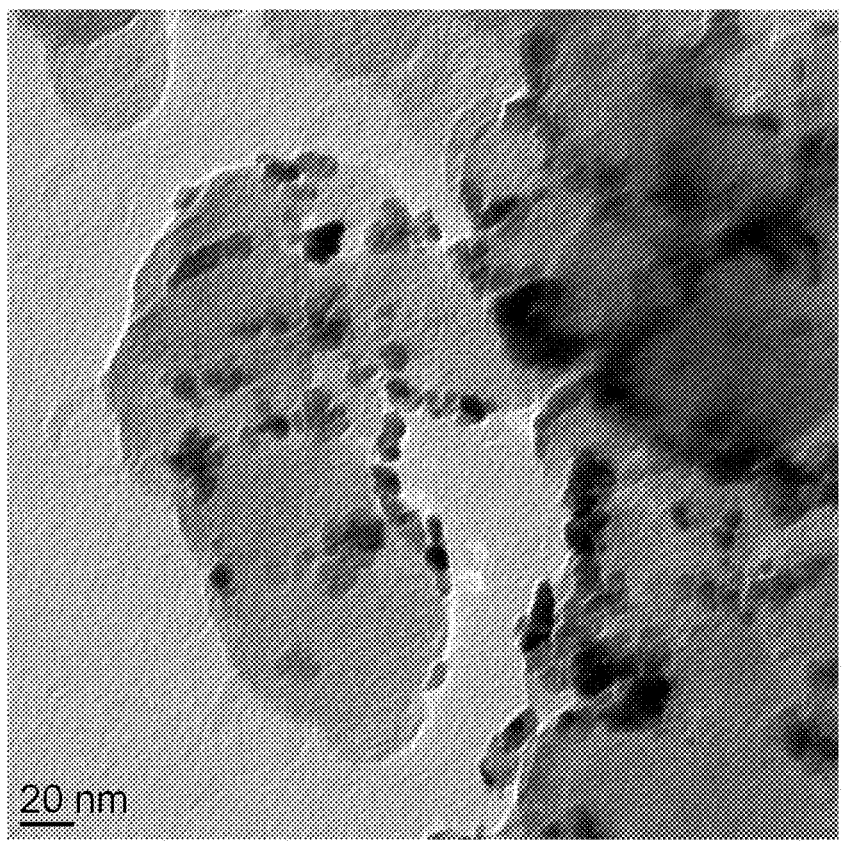
FIG. 3 is a TEM-Image of Example 2. Potentiostatic pulse deposition of platinum catalyst particles.

The layer dried in the vacuum is introduced in the deposition device and deposited according to the following parameters:

Mode: potentiostatic double pulse
Nucleation potential: 50 mV vs. DHE
Nucleation time: 1 ms
Growth potential: 150 mV vs. DHE
Growth time: 100 ms
Break time (open circuit): 50 ms
Deposition duration: 15 minutes
Wetted hydrogen stream (95% relative moisture at 25° C.): 40 ml/min
Nitrogen stream: 100 ml/min During deposition (FIG. 3), nanocrystalline platinum particles 5-10 nm in diameter with agglomerate formation of up to 20 nm are formed with a platinum charge of 1 mg-Pt/cm$^2$.

Example 3

Galvanostatic Pulse Deposition of Platinum Catalyst Particles

Analogous to Examples 1 and 2, a commercially available GDL with MPL is impregnated with a platinum precursor for the production of the precursor layer, or a precursor layer produced per printed documentation WO 2008/101635 A1 and WO 2009/010300 A1 is used.

Figure 4:
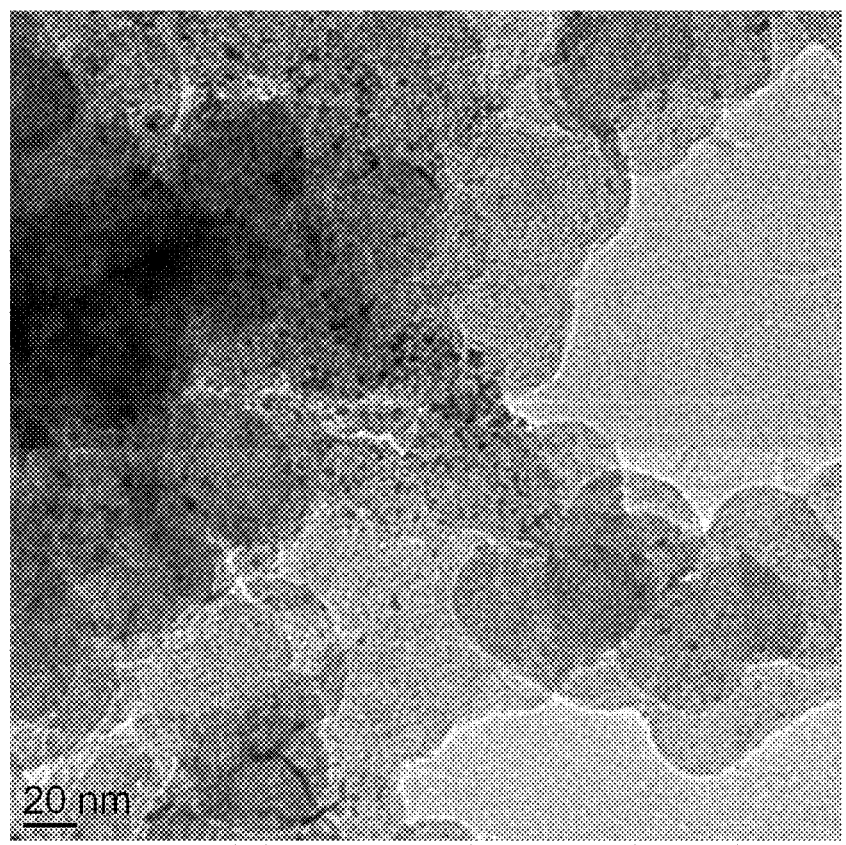
FIG. 4 is a TEM-Image of Example 3. Galvanostatic pulse deposition of platinum catalyst particles.

The layer dried in the vacuum is introduced in the deposition device and deposited according to the following parameters:

Mode: galvanostatic simple pulse
Pulse current density: 300 mA/cm$^2$
Pulse duration: 0.5 ms
Break time (open circuit): 2.5 ms
Deposition duration: 15 minutes
Wetted hydrogen stream (95% relative moisture at 25° C.): 150 ml/min
Nitrogen stream: 300 ml/min During deposition (FIG. 4), nanocrystalline platinum particles 2-5 nm in diameter with a platinum charge of 1 mg-Pt/cm$^2$ are formed. No agglomerate formation noted.

The invention claimed is:

1. A method for electrochemical deposition of nanoscale catalyst particles in a device comprising a working electrode, a counter electrode and
   an ionomer membrane between said working electrode and said counter electrode, the method comprising:
   a working electrode comprising a precursor layer comprising at least one metal salt that has been previously deposited whereby the catalyst particles are deposited from the precursor layer;
   a hydrogen consuming anode which is suitable for hydrogen oxidation and which functions as the counter electrode;
   wherein a working electrode potential shows at least mainly positive signs with respect to the hydrogen consuming anode during the deposition process in respect of time; and
   an inert gas is applied to the working electrode during the deposition process so that a working electrode-side moisture is reduced and simultaneously formation of hydrogen at the working electrode can be mostly or completely prevented.

2. The method of claim 1, wherein the working electrode potential with respect to the hydrogen consuming anode is positive at least 90% of the total deposition time.

3. The method of claim 2, wherein the working electrode potential with respect to the hydrogen consuming anode is always positive in order to completely prevent simultaneous formation of hydrogen at the working electrode during the deposition process.

4. The method of claim 1, whereby the precursor layer is applied to a gas diffusion layer (GDL).

5. The method of claim 1, wherein the precursor layer with a simultaneous or subsequent deposition of one or more precursors is applied and dried through an established coating process.

6. The method of claim 5, wherein the precursor layer includes one or more substrate materials, one or more ionomers, and the precursors.

7. The method of claim 1, wherein binding agents, dispersion agents, wetting agents, solvent mixtures, thickeners and/or antioxidants are added as additives to a dispersion for the production of the precursor layer so that the application and adhesion of the layer can be improved.

8. The method of claim 1, wherein grain refiners, surfactants and/or complexing agents are added as additives to the precursor layer, thereby influencing the deposition.

9. The method of claim 1, wherein the nanoscale catalyst particles are produced electrochemically, and which contain one or more of the elements Pt, Ru, Au, Co, Cr, Fe, Cu, Ni, Zn, Rh, Pd, Sn, Re, Os, Ir, Cd and Ag.

10. The method of claim 1, wherein the electrochemical deposition is caused at the working electrode by a constant or variable voltage.

11. The method of claim 1, wherein the electrochemical deposition is caused at the working electrode by a constant or variable current.

12. The method of claim 1, wherein alkaline and/or acidic polymer electrolytes are introduced as ionomer membranes.

13. The method of claim 1, wherein the process is performed in batch or continuous operation.

14. The method of claim 1, wherein the precursor layer is applied to a gas diffusion layer (GDL) consisting of carbon fiber paper, carbon fiber fleece, carbon fiber fabric, carbon fiber netting, metal netting, woven fabrics with conductive properties or plastic substrates with conductive properties, with or without MPL (microporous layer).

15. The method of claim 1, wherein the electrochemical reduction of the at least one metal salt takes place at temperatures between 0 and 200 ° C.

* * * * *